(12) United States Patent
Song et al.

(10) Patent No.: US 10,751,909 B2
(45) Date of Patent: Aug. 25, 2020

(54) SUPPORT-FREE ADDITIVE MANUFACTURING OF CERAMICS

(71) Applicant: University of Iowa Research Foundation, Iowa City, IA (US)

(72) Inventors: Xuan Song, Iowa City, IA (US); Li He, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 15/998,708

(22) Filed: Aug. 16, 2018

(65) Prior Publication Data

US 2019/0054652 A1 Feb. 21, 2019

Related U.S. Application Data

(60) Provisional application No. 62/546,090, filed on Aug. 16, 2017.

(51) Int. Cl.
*B28B 1/00* (2006.01)
*B33Y 80/00* (2015.01)
(Continued)

(52) U.S. Cl.
CPC ............. *B28B 1/001* (2013.01); *B29C 64/165* (2017.08); *B29C 64/214* (2017.08); *B33Y 10/00* (2014.12);
(Continued)

(58) Field of Classification Search
CPC ...................................................... B28B 1/001
(Continued)

(56) References Cited

U.S. PATENT DOCUMENTS

| 4,575,330 A | 3/1986 | Hull et al. |
| 5,503,785 A | 4/1996 | Crump et al. |

(Continued)

FOREIGN PATENT DOCUMENTS

| CN | 104526838 A | 4/2015 | |
| WO | WO-2014068579 A1 | 5/2014 | |
| WO | WO-2016030884 A1 * | 3/2016 | ......... G05B 19/4097 |

OTHER PUBLICATIONS

Zeyu, Chen et al.; 3D Printing of piezoelectric element for energy focusing and ultrasonic sensing; Jun. 27, 2016; Nano Energy, whole document (Year: 2016).*

(Continued)

*Primary Examiner* — Tahseen Khan
(74) *Attorney, Agent, or Firm* — Schwegman Lundberg & Woessner, P.A.

(57) ABSTRACT

According to various embodiments, a system for forming a ceramic part includes a chamber having a first closed end and a second end defining an opening. The platform is disposed within the chamber and adapted to move vertically in a z-direction between the first closed end and the second end. An applicator is adapted to move laterally in an x-y direction. The applicator includes a beveled edge. A light source is positioned in line with the second end of the chamber. A digital micro-mirror device is positioned between the light source and the second end of the chamber. The shutter is movable between a first open position and a second open position. A first image is projected when the digital micro-mirror device is in the first open position and a second image, different than the first image is projected when the digital micro-mirror device is in the second open position.

21 Claims, 3 Drawing Sheets

(51) Int. Cl.
 B33Y 70/00 (2020.01)
 B33Y 30/00 (2015.01)
 B33Y 10/00 (2015.01)
 B29C 64/165 (2017.01)
 B29C 64/214 (2017.01)
 B29C 64/277 (2017.01)
(52) U.S. Cl.
 CPC ............ B33Y 30/00 (2014.12); B33Y 70/00 (2014.12); B33Y 80/00 (2014.12); *B29C 64/277* (2017.08)
(58) Field of Classification Search
 USPC ..................................................... 428/212
 See application file for complete search history.

(56) References Cited

U.S. PATENT DOCUMENTS

| | | | |
|---|---|---|---|
| 6,228,923 | B1 | 5/2001 | Lombardi et al. |
| 7,875,342 | B2 | 1/2011 | Smith et al. |
| 8,845,953 | B1 | 9/2014 | Balistreri et al. |
| 9,492,968 | B2 | 11/2016 | Wang et al. |
| 2014/0163717 | A1* | 6/2014 | Das ..................... C30B 13/32 700/119 |
| 2016/0168453 | A1 | 6/2016 | Florio et al. |
| 2017/0008236 | A1 | 1/2017 | Easter et al. |
| 2017/0017067 | A1* | 1/2017 | Ohno ................... B33Y 30/00 |
| 2017/0297323 | A1* | 10/2017 | Yamazaki ........... B29C 64/188 |
| 2017/0361533 | A1* | 12/2017 | Meshorer ........... A61B 17/1617 |

OTHER PUBLICATIONS

Tieshu Huang et al.; Aqueous-based freeze-form extrusion fabrication of alumina components, 2009; Rapid Prototyping Journal; whole document (Year: 2009).*
Xuang Song et al.; Ceramic Fabrication using Mask-Image-Projection-based stereolithography integrated with tape-casting, Jul. 17, 2015; Journal of Manufacturing Processes; whole document (Year: 2015).*
Andreassen, Erik, "How to determine composite material properties using numerical homogenization", Computational Materials Science, 83, (214), 488-495.
Bertsch, Arnaud, "Microfabrication of Ceramic Components by Microstereolithography", Journal of Micromechanics and Microengineering, (2004), 197-203.
Cesarano, Joseph, et al., "Recent Developments in Freeform Fabrication of Dense Ceramics From Slurry Deposition", (1997), 11 pgs.
Chen, Z, et al., "3D printing of piezoelectric element for energy focusing and ultrasonic sensing", Nano Energy, 27, (2016), 78-86.
Cheng, W, et al., "Multi-objective optimization of part-building orientation in stereolithography", Rapid Prototyping Journal, 1(4), (1995), 12-23.
Hinczewski, C, et al., "Ceramic suspensions suitable for stereolithography", Journal of the European Ceramic Society, 18(6), (1998), 583-590.
Huang, T, et al., "Aqueous-based freeze-form fabrication of alumina components", Rapid Prototyping Journal, 15(2), (2009), 88-95.
Hussein, A, et al., "Advanced larrice support structures for metal additive manufacturing", Journal of Materials Processing Technology 213(7), (2013), 1019-1026.

Inzana, J, et al., "3D printing of composite calcium phosphate and collagen scaffolds for bone regeneration", Biomaterials, 35(13), (2014), 4026-4034.
Kataria, A, et al., "Building around inserts: methods for fabricating complex devices in stereolithography", Rapid Prototyping Journal, 7(5), (2001), 253-262.
Li, Jia Ping, et al., "Porous Ti6Al4V scaffold directly fabricating by rapid prototyping: Preparation and in vitro experiment", Biomaterials 27, (2006), 1223-1235.
Mott, M, et al., "Solid freeforming of silicon carbide by inkjet printing using a polymeric precursor", Journal of the American Ceramic Society, 84(2), (2001), 307-313.
Scheithauer, U, et al., "Thermoplastic 3D printing—an additive manufacturing method for producing dense ceramics", International Journal of Applied Ceramic Technology, 12(1), (2015), 26-31.
Schwentenwein, M, et al., "Additive manufacturing of dense alumina ceramics", International Journal of Applied Ceramic Technology, 12(1), (2015), 1-7.
Shahzad, K, et al., "Additive manufacturing of alumina parts by indirect selective laser sintering and post processing", Journal of Materials Processing Technology 213(9), (2013), 1484-1494.
Song, X, et al., "Ceramic fabrication using Mask-Image-Projection-based Stereolithography integrated with tape-casting", Journal of Manufacturing Processes, 20, (2015), 456-464.
Song, Xuan, et al., "Development of a low-cost parallel kinematic machine for multidirectional additive manufacturing", Journal of Manufacturing Science and Engineering, 137(2)., (2015), 021005-1-021005-13.
Strand, G, et al., "A new approach to the design and optimisation of support structures in additive manufacturing", The International Journal of Advanced Manufacturing Technology, 66(9-12), (2013), 1247-1254.
Su, B, et al., "Green ceramic machining: A top-down approach for the rapid fabrication of complex-shaped ceramics", Journal of the European Ceramic Society, 28(11), (2008), 2109-2115.
Tasaki, Satoko, et al., "Fabrication of Oxide Ceramics Dendrites for Porous Electrodes by Using Stereolithography", IMAPS/ACerS 8th International CICMT Conference and Exhibition, (2012), 000152-000157.
Vanek, J, et al., "Clever support: Efficient support structure generation for digital fabrication", Computer Graphics Forum, vol. 33, No. 5, (2014), 117-125.
Wang, Liwu, et al., "Near-Net Shape Forming of Advanced Ceramics", Advanced Engineering Materials 2000, 2, No. 3, (2000), 110-113.
Wilkes, J, et al., "Additive manufacturing of ZrO2-Al2O3 ceramic components by selective laser melting", Rapid Prototyping Journal 19(1), (2016), 51-57.
Xu, F, "Considerations and selection of optimal orientation for different rapid prototyping systems", Rapid Prototyping Journal, 5(2), (1999), 54-60.
Zak, C, et al., "Additive manufacturing of polymer-derived ceramics", Science, 351(6268), (2016), 58-62.
Zhang, Q, et al., "3D Printing of Graphene Aerogels", Small, No. 13, (2016), 1702-1708.
Zhao, G, et al., "Solid Mechanics Based Design and Optimization for Support Structure Generation in Stereolithography Based Additive Manufacturing", ASME International Design Engineering Technical Conferences and Computers and Information in Engineering Conference, (2015), 8 pgs.

* cited by examiner

SUPPORT-FREE ADDITIVE MANUFACTURING OF CERAMICS

CROSS-REFERENCE TO RELATED APPLICATION

This application claims the benefit of priority to U.S. Provisional Patent Application Ser. No. 62/546,090 entitled "SUPPORT-FREE ADDITIVE MANUFACTURING OF CERAMICS," filed Aug. 16, 2017, the disclosure of which is incorporated herein in its entirety by reference.

BACKGROUND

The present disclosure relates to additive manufacturing, and more particularly, to additive manufacturing products and methods. Conventional machining relies on removal of material and is often limited in terms of part complexity. Additive manufacturing avoids many of these issues, resulting in the capability for producing near net shaped products with highly complex geometries.

SUMMARY OF THE DISCLOSURE

According to various embodiments, a system for forming a ceramic part includes a chamber having a first closed end and a second end defining an opening. The platform is disposed within the chamber and adapted to move vertically in a z-direction between a first position proximate to the first closed end and a second position proximate to the second end. An applicator is adapted to move laterally in a planar direction across at least a portion of the second end of the chamber. The applicator includes a beveled edge. A light source is positioned in line with the second end of the chamber. A digital micro-mirror device is positioned between the light source and the second end of the chamber. The digital micro-mirror device has millions of micro-scale reflecting mirrors which are movable between an open position and a closed position. A first image is projected when the first pattern of micro-mirrors in the digital micro-mirror device is in the open position and a second image, different than the first image is projected when the second pattern of micro-mirrors in the digital micro-mirror device is in the open position.

According to various embodiments, a method of forming a ceramic part includes at least partially immersing a substrate in a ceramic slurry. The slurry has a viscosity ranging from about 3 Pas to about 500 Pas. A first layer of the ceramic slurry is scraped across a portion of a first surface of the substrate. Scraping at least one of the first layer of ceramic slurry and the second layer of ceramic slurry can include biasing an applicator having a beveled edge against the layer and moving the applicator in a planar direction. The first layer of the ceramic slurry is cured to form a first cured ceramic layer. The substrate is moved from a first position to a second position to at least partially immerse the first cured ceramic layer in the ceramic slurry. A second layer of the ceramic slurry is scraped across a first surface of the first cured ceramic layer. A surface area of a first surface of the second layer of the ceramic slurry is larger than a surface area of a first surface of the first cured ceramic layer. The second layer of the ceramic slurry is cured to form a second cured ceramic layer.

BRIEF DESCRIPTION OF THE FIGURES

The drawings illustrate generally, by way of example, but not by way of limitation, various embodiments discussed in the present document.

DETAILED DESCRIPTION

Figure 1A:
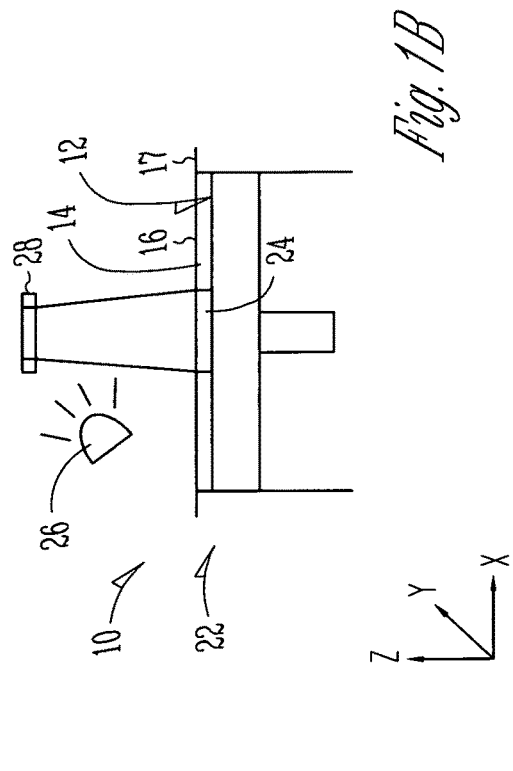
FIGS. 1A-1D are schematic diagrams illustrating operations of a method of forming a ceramic part, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The statement "at least one of A and B" has the same meaning as "A, B, or A and B." Any use of section headings is intended to aid reading of the document and is not to be interpreted as limiting; information that is relevant to a section heading may occur within or outside of that particular section.

The term "substantially" as used herein refers to a majority of, or mostly.

According to various examples of the present disclosure a ceramic part can be additively manufactured according to the disclosed methods by using the disclosed system.

Additive manufacturing (AM) fabricates a product directly from a Computer Aided Design (CAD) model regardless of geometric complexity. Examples of additive manufacturing processes for ceramic fabrication include extrusion freeform fabrication (EFF), Stereolithography (SLA), binder/ink jetting, and Selective Laser Sintering (SLS). Among these processes, SLA, as an example, can produce better resolution and higher density can be achieved in final ceramic part production. Generally, an SLA process involves filling a tank with photosensitive resin, which solidifies once exposed to UV light; a dynamic digital image (or a laser dot) is projected onto the liquid surface to solidify the resin layer by layer.

When employed to fabricate ceramics, SLA can function in the same manner as polymer fabrication, however, the feedstock material is changed from pure photocurable resin to a mixture of ceramic powders and resin. It can sometimes be helpful in fabrication of ceramic parts with SLA to include a ceramic-polymer composite support structure (also called green part). After formation of the ceramic part, the green part is de-binded and sintered through a heat-treatment process, during which the polymer in the composite part is removed and the remaining ceramic particles are consolidated into pure ceramic compacts.

Support structures are used in SLA processes when building overhanging features. There can be several drawbacks however in using a support structure. For example, not only is extra time required to remove the added support structures after fabrication, but a fracture tip containing numerous micro-cracks at the location where the support is removed is introduced. These microscopic defects can propagate during heat treatment and ultimately lead to cracks and delamination of green parts. In addition, support fracture tips left on a final component can cause stress concentration when the component is under load, which can adversely impact the inherent material properties of the final product.

Some attempts to eliminate or reduce the influence of support structures in AM, include the use of soluble supports, building orientation optimization, and support structure optimization design. Briefly, the soluble support method builds a support (e.g., a cylindrical structure) separately with a soluble material, which can be removed by submergence in a specific solution. Since this method involves frequent switching between two types of materials, the process is more complicated. Alternatively, building orientation and support structure optimization design can reduce the amount of materials used in support structures, however some support structures are inevitable and the risk of crack occurrence still exists in heat treatment.

This disclosure describes a method making use of unique rheological behaviour of ceramic slurry to support overhanging features. Highly-loaded ceramic slurry (e.g., ceramic-resin mixture with a high solid loading of ceramic powders) exhibits a pseudoplastic flow behaviour with yield stress; that is, it does not deform until the stress becomes larger than its yield stress. Accordingly, the disclosed SLA process exploits yield stress of highly loaded ceramic slurry to support overhanging features without building any extra structure. In existing ceramic SLA processes, highly-loaded ceramic slurry with yield stress is undesirable since its viscosity is too high to efficiently feed new materials and recoat a thin layer. The slurry is hence usually diluted to meet SLA process requirement for viscosity (e.g., lower than 3000 mPas). Rather than diluting the ceramic slurry, the disclosed method conversely increases its viscosity to achieve a high yield stress for support. The viscosity can be measured with an ANTON PAAR MCR72 rheometer.

Overhanging features that require supporting structures beneath can be categorized as simply-supported, cantilevered (e.g., continuous) and floating features (e.g., discontinuous). An overhanging feature is subject to weight, buoyant force and end support force within a ceramic slurry. Weight is evidently greater than the buoyant force due to a larger density of cured materials than uncured and hence induces stress in the material upon which the feature rests. In conventional liquid resin fabrication, this stress can deform the liquid beneath the structure and the structure will either bend or settle. Unlike liquid resins, ceramic slurry exhibits pseudoplastic behaviour with yield stress. This property renders support of an overhanging feature by a highly-loaded ceramic slurry itself feasible.

Disclosed herein is an AM process and system which can fabricate ceramic components without building support structures. The process and system makes use of high yield stress of highly loaded ceramic slurry to support overhanging features. The AM process is schematically shown in FIG. 1A-1D. As shown in FIG. 1A, at operation 11, ceramic slurry 14 is spread on platform 12. The ceramic slurry is high viscosity slurry. As a non-limiting example, the viscosity of ceramic slurry 14 can be in a range from about 3 Pas to about 500 Pas, about 3 Pas to about 200 Pas, or less than, equal to, or greater than about 3 Pas, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 370, 375, 380, 385, 390, 395, 400, 405, 410, 415, 420, 425, 430, 435, 440, 445, 450, 455, 460, 465, 470, 475, 480, 485, 490, 495, or about 500 Pas.

Ceramic slurry 14 can include many suitable components. For example, ceramic slurry 14 can include ceramic powders and photocurable resin. The ceramic powder can range from about 10 wt % to about 99 wt % of ceramic slurry 14 or about 10 wt % to about 80 wt %. The ceramic powder can include many suitable ceramic materials. Non-limiting examples of suitable ceramic materials can include fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, or mixtures thereof. The photocurable resin can be chosen from a material such as Formlabs CLEAR RESIN, available from Formlabs, of Beloeil Canada or ENVISION TEC SI500, available from Envisiontec, of Glabeck Germany.

A first layer of ceramic slurry 14 is scraped across second end 17 of chamber 42 and a portion of first surface 16 of platform 12, which is flush with second end 17. The portion of first surface can range from about 5% surface area to about 100% surface area, about 20% surface area to about 70% surface area, or less than, equal to, or greater than about 5% surface area, 10, 15, 20, 25, 30, 35, 40, 45, 50, 55, 60, 65, 70, 75, 80, 85, 90, 95, or about 100% surface area. Scraping is accomplished with applicator 18. As shown in FIG. 1A, applicator 18 is shown as a blade including beveled edge 20. In operation, beveled edge 20 is biased against platform 12. Applicator 18 then moves across platform 12 in a planar direction (e.g., in the x-direction or y-direction). This results in the spreading of ceramic slurry 14 thereon as a thin layer of ceramic slurry.

Figure 1B:
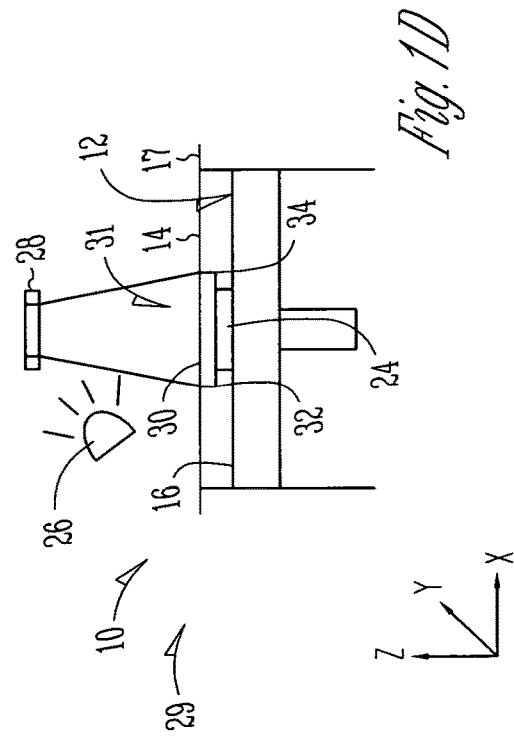

As shown in FIG. 1B, in operation 22, the layer of ceramic slurry 14 that was scraped across platform 12 is cured to form first cured ceramic layer 24. First cured ceramic layer 24 is cured by exposing the layer of ceramic slurry 14 to a light pattern. Light is provided by light source 26. Light interacts with digital micro-mirror device 28, which is schematically shown. Digital micro-mirror device 28 includes a plurality of micro mirrors that can be specifically oriented in an open position and a closed position to dynamically project a digital image to slurry surface 16. The size and shape of first cured ceramic layer 24 generally corresponds to the light pattern projected by digital micro-mirror device 28. An example of a suitable digital micro-mirror is Texas Instruments' Digital Micro-mirror Device (DMD). The image pattern can be used to create a multitude of shapes of the ceramic shapes. The slurry can be exposed to the image for a few seconds before the projection system is turned off and the platform is moved down to deposit another layer thickness on the first.

Figure 1C:
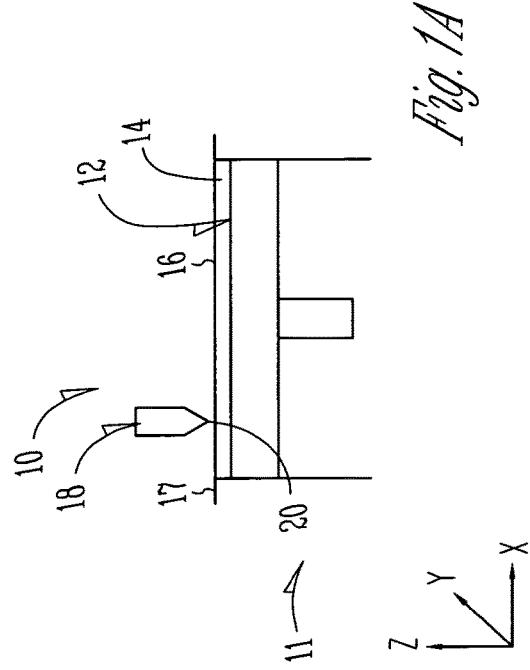

As shown in FIG. 1C, in operation 27, after first cured ceramic layer 24 is formed, platform 12 is moved in a z-direction to lower first cured ceramic layer 24. Platform 12 and first cured ceramic layer 24 are moved together with ceramic slurry 14 surrounding it. This can ensure that a minimum shear stress is imparted on first cured ceramic layer 24 from surrounding ceramic slurry 14

Platform 12 can be positioned in the z-direction in a first, second, or third position or infinitely positioned therein within the chamber along the z-direction. As further shown in operation 27, a second layer of ceramic slurry is scraped across first cured ceramic layer 24. In this manner, first cured ceramic layer 24 acts as a substrate for an additional cured ceramic layer. The layer of ceramic slurry is scraped across an area that exceeds the entirety of first cured ceramic layer 24. Thus the layer of ceramic slurry is larger, by surface area, than first cured ceramic layer 24. The high viscosity of ceramic slurry 14 helps to maintain the shape of the layer of ceramic slurry.

Figure 1D:
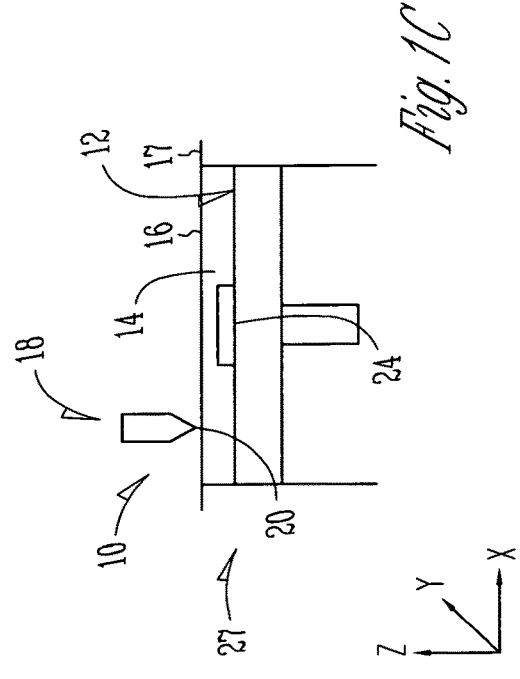

As shown in FIG. 1D, in operation 29 the layer of ceramic slurry 14 that was scraped across first cured ceramic layer 24 is cured by exposing the layer of ceramic slurry 14 to light. This forms second cured ceramic layer 30. Digital micro-mirror device 28 is projecting a second light pattern. In the second pattern, digital micro-mirror device 28 has the mirrors oriented in a different configuration. This results in second cured ceramic layer 30 having a different size that in this example is larger, by surface area, than first cured ceramic layer 24. Forming second cured ceramic layer 30 results in the formation of ceramic part 31. As shown, second cured ceramic layer 30 includes overhangs 32 and 34. Notably overhangs 32 and 34 are formed without using a support structure in method 10.

While ceramic part 31 is shown as including first and second cured ceramic layers 24 and 30 it is understood that that ceramic part 31 can include further cured ceramic layers. Additionally, the ceramic layers can be continuous or discontinuous. The number of cured ceramic layers forming ceramic part 31 can vary, but for example, ceramic part 31 can include 5 or more layers, or 20 or more cured ceramic layers. The maximum number of layers can vary greatly, determined, for example, by considerations such as the size of the ceramic part being manufactured, the technique used, the capabilities of the equipment used, and the level of detail desired in the final ceramic part. For example, 5 to 100,000 layers can be formed, or 20 to 50,000 layers can be formed, or 50 to 50,000 layers can be formed.

It is to be understood that "cured ceramic layer" includes a layer having any shape, regular or irregular, and having at least a predetermined thickness. The thickness of each layer can vary widely depending on the light exposure intensity and the used ceramic powders. For example, the individual layers can be each, on average, about 50 microns thick for Barium Titanate (BTO) slurry, or about 200 microns thick for alumina slurry.

Figure 2:
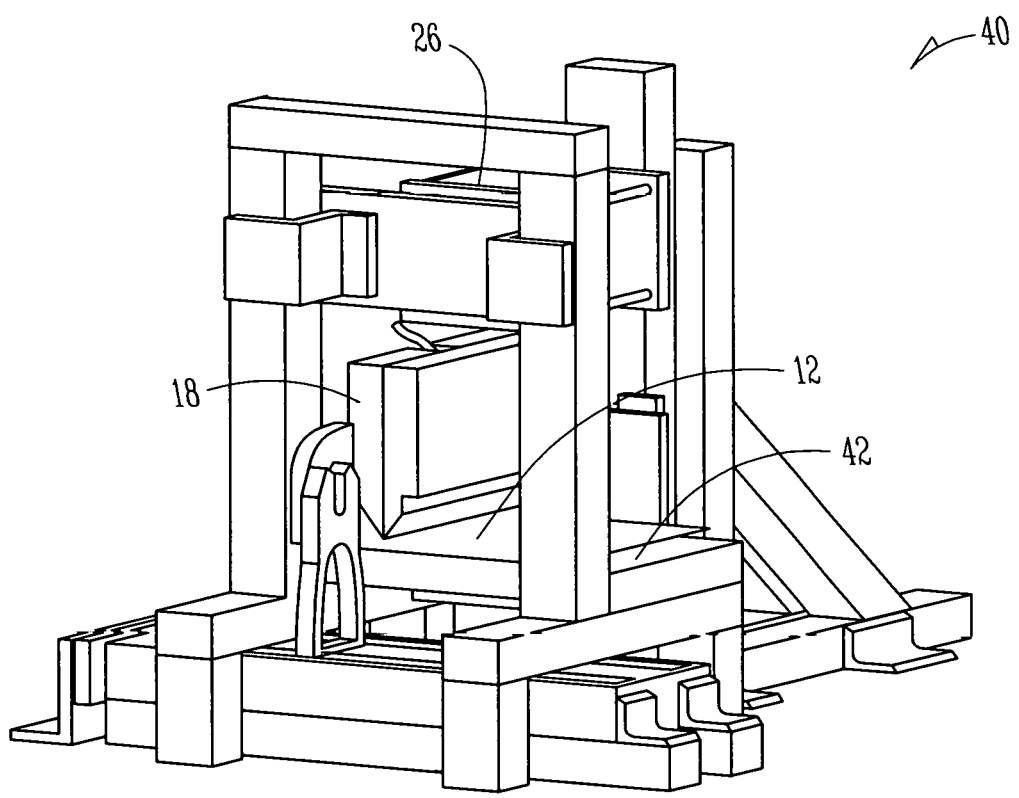
FIG. 2 is a perspective view of a system for forming a ceramic part, in accordance with various embodiments.

Various machines or systems can be used for executing method 10. An example of a suitable system is shown in FIG. 2. FIG. 2 is a perspective view of system 40. System 40 includes chamber 42, platform 12, applicator 18, and image projector 26. In operation, system 40 produces ceramic part 31 largely according to method 10.

System 40 can differ in operation slightly from method 10, however. An example can be in applicator 18. As shown in FIG. 2 applicator 18 includes a channel with an exit at beveled tip 20. The ceramic slurry can be dispensed through the channel and subsequently scrapped with beveled tip 20 as applicator moves in the x-y direction. Thus, as applicator 18 moves across platform 12 it extrudes one layer of the ceramic slurry into the chamber with a minimum shear force onto a previous cured layer. This coating process is also called curtain coating. System 40 further includes light source 26. Light source 26 can be a light emitting diode, a laser, a halogen lamp, a xenon lamp, a mercury lamp, etc. The projection system can be activated to project a digital UV image pattern onto the slurry surface. The procedure is repeated with system 40 until the component is completed.

Figure 4:
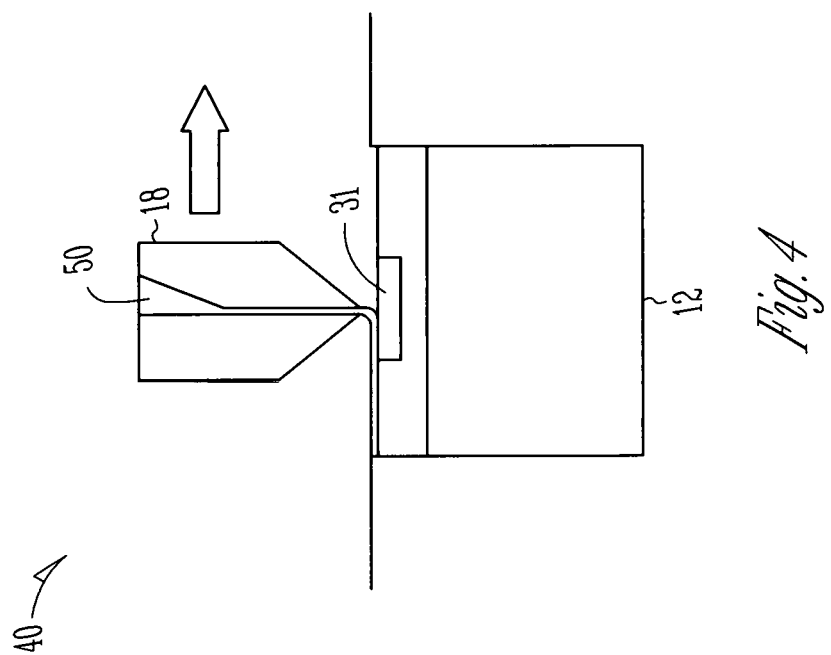
FIG. 4 is a schematic diagram of another system for forming a ceramic part, in accordance with various embodiments.
Figure 3:
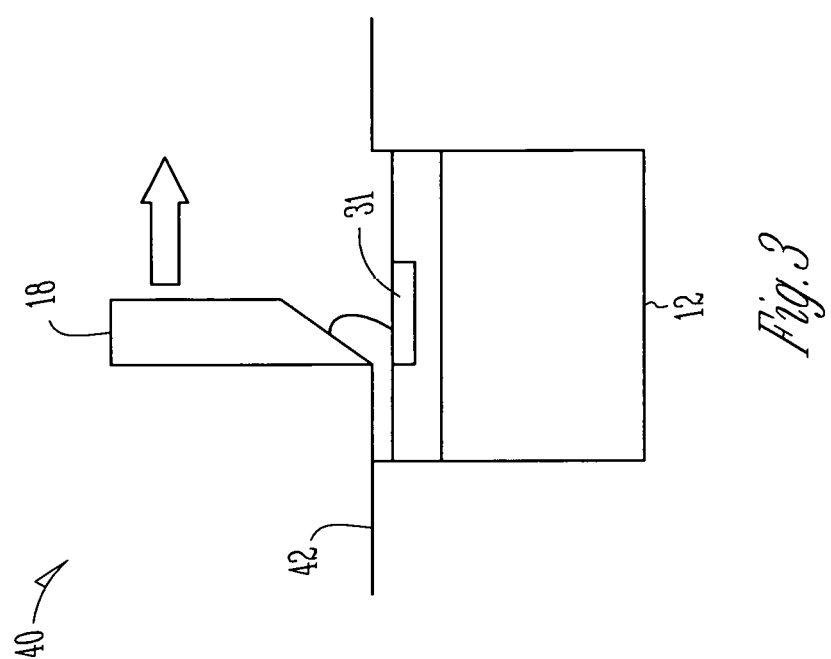
FIG. 3 is a schematic diagram of another system for forming a ceramic part, in accordance with various embodiments.

FIG. 3 is a sectional view of a portion of system 40 in which applicator 18 is a doctor blade. The doctor blade functions to spread ceramic slurry 14 over a substrate or previously cured layer. FIG. 4 is a sectional view of system 40 in which applicator 18 is a is a slot die. The slot die includes channel 50 through which ceramic slurry 14 can flow and be applied to a substrate or cured part.

Any element of system 40 can be temperature controlled. For example, applicator 18 can be heated while platform 12 can be cooled. This can be accomplished for example, by adding thermoelectric components to any component to directly control the temperature. In further embodiments, heating applicator 18 can be helpful to promote flow of ceramic slurry 14 through applicator 18. To promote flow, applicator 18 can be heated to a temperature in a range of from about 50° C. to about 150° C., about 60° C. to about 100° C., or less than, equal to, or greater than about 50° C., 55, 60, 65, 70, 75, 80, 85, 90, 95, 100, 105, 110, 115, 120, 125, 130, 135, 140, 145, or about 150° C.

While increasing the temperature of applicator 18 can promote the extrusion of ceramic slurry 14 from applicator 18, increased temperatures in ceramic slurry 14 can increase flow of ceramic slurry 14 deposited on platform 12 and thereby reduce the supportability of ceramic slurry 14 for part 31. Therefore it can be helpful to cool platform 12. For example, platform 12 can be maintained at a temperature in a range of from about 0° C. to about 40° C., about 15° C. to about 25° C., or less than, equal to, or greater than about 0° C., 5, 10, 15, 20, 25, 30, 35, or about 40° C. Contacting the cooled platform 12 can impart a high yield stress in the ceramic part, which can allow it to maintain its shape and position. In some embodiments, it may be desirable to heat platform 12, and the thermoelectric component can be adapted to selectively heat or cool platform 12. In other embodiments, a heating block can be attached to platform 12.

EXAMPLES

Various embodiments of the present disclosure can be better understood by reference to the following Examples. The present disclosure is not limited to the Examples given herein.

Experiments have been performed to verify the role of slurry in supporting overhanging features. A simple testbed was made based on the design shown in FIGS. 3 and 4, in which the machine included of two linear stages, building platform, a slot die coating system and a 405 nm Ultraviolet (UV) light engine. The slot die was employed to dispense a thin layer of slurry. The thickness of the layer was adjusted by changing the thickness of a shin at the outlet of the slot die. Slurry was stored in a syringe, which was pressurized by an air pump under a certain speed. A thin layer of slurry was dispensed onto a platform, which moves down a chamber one layer of thickness per deposit pass. A doctor blade was moved manually to coat thin layers of slurry. Two test cases were designed to test how slurry can support different categories of overhanging features, including floating and cantilevered features.

Example 1.1

In Example 1.1, a 10×15×1.94 mm block was directly fabricated on a free slurry surface. The example was carried out in the following steps:
i. Feed slurry onto the platform and spread the material to a uniform layer with the doctor blade. Measure the depth of the slurry as $H_{\_initial}$. Due to shear thinning behavior of the material, it does not flow after being spread out.
ii. Activate the light engine and project an image of a rectangle (10×15 mm) onto the slurry surface for 30 seconds. The cure depth of the slurry under a cure time of 30 s is 160 µm.
iii. Move down the building platform for a distance of 130 µm and spread new slurry into the yielded space with the doctor blade. As a result, a fresh layer with a thickness of 130 µm forms on top of the previous layer, which is thinner than cure depth of the material. This thickness can ensure that this layer bonds together with the previous layers.
iv. Repeat step ii and iii until the designed part is accomplished.

After the last layer of the model was cured, thickness of the slurry on the building platform was measured, denoted by $H_{\_finish}$. The fabricated part was then cleaned and its thickness was measured as $H_{\_part}$. The difference between $H_{\_finish}$ and $H_{\_part}$ represents the depth of the part in the slurry with respect to the building platform surface when fabrication was done. If this depth is close to the initial depth of the slurry $H_{\_initial}$, it was understood that the part didn't settle during fabrication. From measurement, values of: $H_{\_initial}=0.96$ mm, $H_{\_finish}=2.95$ mm, $H_{\_part}=1.94$ mm were obtained. The final depth of the fabricated part was then calculated as $H_{\_finish}-H_{\_part}=1.01$ mm≈$H_{\_initial}$. The slight increase in the final depth can be explained by measurement errors. Therefore, it was concluded that floating features can be supported by slurry. However, it was observed that an evident misalignment exists between neighboring layers. This result is because previous layers were dragged from their position when a blade was used to spread slurry. In the next Example, the use of a slot die in dispensing material to minimize shear force in layer recoating was studied.

Example 1.2 Building Cantilevered Features

A cantilevered component was fabricated in the same manner as Example 1.1 to further study how slurry can support cantilevered features having a length of 10 mm, a thickness of 1.5 mm and a width of 10 mm. The height of the left cantilevered beam above the base is designed to be 2 mm and the right beam is 3.5 mm. After fabrication is finished, slurry beneath the two overhanging beams, serving as support during the process, was manually washed away. It was observed that both cantilevered beams were successfully built without any solid support structures.

Example 1.3

Another example of an AM process was studied. On fabrication initiation, the platform is positioned at the same height as the end surface of the chamber. To build one layer, the platform moves down one-layer thickness. The slot die then moves across the platform and extrudes one layer of slurry into the chamber. A projection system is activated to project a digital UV image pattern onto the slurry surface, which is dynamically defined by a Texas Instruments' Digital Micro-mirror Device (DMD). The slurry is exposed to the image for a few seconds before the projection system is turned off and the platform is moved down to deposit another layer thickness on the first. The procedure is repeated until the component is completed.

Example 2

A ceramic slurry with sufficient yield stress, a specific weight ratio of ceramic powder was first mixed with commercially-available photocurable resin (FLGPWHOI from Formlabs, Boston, USA) and 0.8% dispersant (phosphate ester, PS-131, AkzoNobel, Amsterdam, Netherlands) in a ball mill machine for 2 hours at a speed of 300 rmp. The mixed slurry was then degassed in a vacuum chamber for 12 hours at the vacuum of −1~−1.5 bar. To examine the effects of solid loading on rheological behaviors and photosensitivity of the slurry, Aluminium Oxide powder ($Al_2O_3$, CR1, Baikowski, Charlotte, USA) was used.

Rheological behaviours and photosensitivity of alumina slurry with solid loadings from ~0 wt % to ~70 wt % were studied. Rheological behaviours of different alumina slurry were measured with a rheometer (MCR72, Anton Paar, Ashland, Va., USA). Viscosity and shear stress curves with respect to shear rates suggests the slurry has a shear thinning behaviour of Bingham pseudoplastic fluid, whose viscosity decreases as applied shear rate increases. This behaviour becomes more evident in the slurry with higher solid loadings. It was found that a higher solid loading, the viscosity of the slurry increases dramatically. For example, the viscosity of 60 wt % slurry is four times as the 50 wt % one at a shear rate of 1 $s^{-1}$. It was found that the y-axis intercept to represent the yield stress of the corresponding slurry. The result indicated that yield stress was increased from 3 Pas to 250 Pas when solid loading was increased from 10 wt % to 70 wt %. The slurry was exposed to the light engine in the fabrication system for a certain amount of time and the thickness of a cured layer was measured using a micro-calliper. When solid loading was increased to 70 wt %, the slurry became extremely insensitive to illumination and its cure depth decreased to be less than 100 µm.

To understand the capability of alumina slurry with different solid loading and yield stress in supporting overhanging features, a weight submergence test was performed. A block in a dimension of 5×15×Hc (width×length×height) was submerged in a slurry. The block was made from the same material as the tested slurry. The final position of the block was observed after 5 minutes. It was observed that the block in pure resin sank to the bottom, the one in the 2 wt % slurry dropped about 1.5 mm from its original vertical position and the one in the 4 wt % slurry remained its position after 5 minutes. This fact suggested that the yield stress of a slurry must be bigger than that of 4 wt % slurry in order to support the testing block.

Maximum weights that could be supported by different slurries were measured in a similar manner. Cylinders with a 10 mm diameter but different heights from 0.1 mm to 100 mm were submerged in each slurry. The final positions of the cylinders in each slurry were observed after sitting for 4 hours. The maximum height among the blocks retaining their vertical positions was recorded and plotted with respect to the solid loading. The experiment result indicated that alumina slurry with a higher solid loading could support larger overhanging features. Moreover, a solid loading of 30 wt % was adequate to fabricate support-free ceramic components since its maximum supporting weight (e.g., a 10 mm diameter and 20 mm height cylinder) is greater than almost all overhanging features that would be fabricated.

Example 3

Several sample parts were fabricated to demonstrate the presented process. Three categories of support structures as included a simple-supported feature (bridge), cantilevered and angle feature. Several bridge-like structures spanning over a distance from 10 mm to 50 mm were fabricated. Their heights are 10 mm and thicknesses are 3 mm. The layer thickness was set as 100 μm. All the parts were successfully built. Slight deformations in the 40 mm and 50 mm bridges were caused by the pressure from a large amount of slurry in the resourvior.

Cantilevered beams with a length of 10 mm, 20 mm, 30 mm, and 40 mm, respectively, were fabricated. No longer beam was selected since the size of the building platform is less than 50 mm. The layer thickness was 100 μm. It was observed that the free ends of the components are thinner than expected. This is because the free ends tend to bend upwards in the initial layers under the drag force from the doctor blade. Nevertheless, the results still indicate that the highly viscous ceramic slurry can support a cantilevered beam over a large distance.

The tilt angles of the fabricated beams are 5°, 15°, 25°, 35° and 45° respectively. Traditional SLA processes require support structures to fabricate beams with a tilt angle smaller than 45°, while the disclosed process can build any tilted beam without building solid support structures.

Among the three categories of overhanging features, the disclosed process can successfully build simply-supported and cantilevered ones without building support structures. However, due to a large shear force induced by the doctor blade, building a floating feature is still a challenge. The part was directly built on the slurry surface without connecting to any previous layers. As a result, each layer of the part shifts for a small distance with regards to previous layers under the shear force from the doctor blade.

Even though the floating feature cannot retain its position in an X-Y plane under the shear force of the doctor blade, it may still be supported along the vertical direction by the ceramic slurry beneath. To verify this, initial position $H_{\_initial}$ of the block and final position $H_{\_finish}$ of the top surface of the block were measured during the fabrication. According to the measurement, we have: $H_{\_initial}$=0.96 mm, $H_{\_finish}$=2.95 mm. The final position of the block can be calculated from $H_{\_finish}$ and $H_{\_part}$=1.94 mm as $H_{\_finish}$−$H_{\_part}$=1.01 mm, which is very close to the initial position $H_{\_initial}$. The slight increase in the final position can be explained by errors from measurements and Z movement.

To further demonstrate the capability of the disclosed process, two Hilbert Cubes were fabricated by both a traditional SLA process and disclosed process. The Hilbert cube was chosen because it embodies all the three categories of overhanging features. As described herein, traditional SLA process requires support structures to build such a complex geometry. Many of these support structures were built inside the components and are thereby very difficult, if not impossible, to remove. With the disclosed process a great number of support structures can be illuminated, only leaving the ones under floating features to avoid horizontal shifts.

More test cases were produced. A model of Stanford Bunny rabbit model built from 60 wt % Alumina slurry without any support was produced. A porous bone scaffold for cleft defect restoration built from 40 wt % Calcium Phosphate was produced. A piezoelectric lattice built from 70 wt % Barium Titanate was also produced.

ADDITIONAL EMBODIMENTS

The following exemplary embodiments are provided, the numbering of which is not to be construed as designating levels of importance:

Embodiment 1 provides a system for forming a ceramic part, the system comprising:

a chamber having a first closed end and a second end defining an opening;

a platform disposed within the chamber and adapted to move vertically in a z-direction between a first position proximate to the first closed end and a second position proximate to the second end;

an applicator adapted to move laterally in a planar direction across at least a portion of the second end of the chamber, the applicator comprising a beveled edge;

a light source positioned in line with the second end of the chamber; and a digital micro-mirror device positioned between the light source and the second end of the chamber, wherein the digital micro-mirror device is movable between an open position and a closed position and a first image is projected when the digital micro-mirror device is in the open position and a second image, different than the first image is projected when the digital micro-mirror device is in the closed position.

Embodiment 2 provides the system of Embodiment 1, wherein the chamber is at least partially filled with a ceramic slurry.

Embodiment 3 provides the system of Embodiment 2, wherein a viscosity of the ceramic slurry ranges from about 3 Pas to about 500 Pas.

Embodiment 4 provides the system of Embodiment 2, wherein a viscosity of the ceramic slurry ranges from about 3 Pas to about 200 Pas.

Embodiment 5 provides the system of any one of Embodiments 2-4, wherein the ceramic slurry comprises a ceramic powder and a photocurable resin.

Embodiment 6 provides the system of Embodiment 5, wherein the ceramic powder ranges from about 10 wt % to about 99 wt % of the ceramic slurry.

Embodiment 7 provides the system of Embodiment 5, wherein the ceramic powder ranges from about 20 wt % to about 80 wt % of the ceramic slurry.

Embodiment 8 provides the system of any one of Embodiments 5-7, wherein the ceramic powder comprises a ceramic material chosen from fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, or mixtures thereof.

Embodiment 9 provides the system of any one of Embodiments 1-8, wherein the platform is adapted to be positioned movable to a third position between the first position and the second position.

Embodiment 10 provides the system of any one of Embodiments 2-9, wherein the beveled edge of the applicator is adapted to press the ceramic slurry against the platform.

Embodiment 11 provides the system of any one of Embodiments 2-10, wherein the applicator further comprises a channel extending through the beveled edge.

Embodiment 12 provides the system of Embodiment 11, wherein the channel is adapted to dispense a portion of the ceramic slurry on the platform.

Embodiment 13 provides the system of any one of Embodiments 1-12, wherein the digital micro-mirror device is further movable to a third position that is different than the first position and the second position.

Embodiment 14 provides the system of any one of Embodiments 1-12, wherein the light source is at least one of a light emitting diode.

Embodiment 15 provides the system of any one of Embodiments 1-12, wherein the light source is a laser.

Embodiment 16 provides the system of any one of Embodiments 1-12, wherein the light source is a halogen lamp.

Embodiment 17 provides the system of any one of Embodiments 1-12, wherein the light source a xenon lamp.

Embodiment 18 provides the system of any one of Embodiments 1-12, wherein the light source is a mercury lamp.

Embodiment 19 provides the system of any one of Embodiments 1-12, wherein the light sources is an ultra violet light source.

Embodiment 20 provides a method of forming a ceramic part, the method comprising:
layering a substrate with a ceramic slurry from an applicator, the ceramic slurry having a viscosity ranging from about 3 Pas to about 500 Pas;
scraping a first layer of the ceramic slurry across a portion of a first surface of the substrate;
curing the first layer of the ceramic slurry to form a first cured ceramic layer;
moving the substrate in a z-direction from a first position to a second position;
scraping a second layer of the ceramic slurry across a first surface of the first cured ceramic layer, wherein a surface area of a first surface of the second layer of the ceramic slurry is larger than a surface area of a first surface of the first cured ceramic layer; and
curing the second layer of the ceramic slurry to form a second cured ceramic layer,
wherein at least one of the first layer of ceramic slurry and the second layer of ceramic slurry comprises a ceramic powder and a photocurable resin.

Embodiment 21 provides the method of Embodiment 20, wherein the substrate is a platform.

Embodiment 22 provides the method of Embodiment 20, wherein the substrate is a cured layer of the ceramic slurry layered on the platform.

Embodiment 23 provides the method of any one of Embodiments 20-22, wherein scraping at least one of the first layer of ceramic slurry and the second layer of ceramic slurry comprises biasing an applicator having a beveled edge against the layer and moving the applicator in an x-y direction.

Embodiment 24 provides the method of Embodiment 23, further comprising dispensing at least one of the first layer of ceramic slurry on the substrate and the second layer of ceramic slurry on the first layer of ceramic slurry through a channel in the applicator.

Embodiment 25 provides the method of any one of Embodiments 20-24, wherein a viscosity of at least one of the first layer of ceramic slurry and the second layer of ceramic slurry ranges from about 3 Pas to about 200 Pas.

Embodiment 26 provides the method of any one of Embodiments 20-25, wherein a viscosity of at least one of the first layer of ceramic slurry and the second layer of ceramic slurry ranges from about 3 Pas to about 100 Pas.

Embodiment 27 provides the method of Embodiment 26, wherein the ceramic powder ranges from about 10 wt % to about 99 wt % of at least one of the first layer of ceramic slurry and the second layer of ceramic slurry.

Embodiment 28 provides the method of Embodiment 26, wherein the ceramic powder ranges from about 20 wt % to about 80 wt % of at least one of the first layer of ceramic slurry and the second layer of ceramic slurry.

Embodiment 29 provides the method of any one of Embodiments 20-28, wherein the ceramic powder comprises a ceramic material chosen from fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, or mixtures thereof.

Embodiment 30 provides the method of any one of Embodiments 20-29, wherein the method is free of including a support structure to form the second cured ceramic layer.

Embodiment 31 provides a ceramic part formed according to the method of any one of Embodiments 20-30, the part comprising:
the first cured ceramic layer;
the second cured ceramic layer adjacent to the first cured ceramic layer,
wherein a surface area of a first surface of the first cured ceramic layer is smaller than a surface area of a first surface of the second cured ceramic layer.

Embodiment 32 provides the ceramic part of Embodiment 31, wherein the first cured ceramic layer and the second cured ceramic layer are free of a fracture tip caused by removal of a support structure.

Embodiment 33 provides the ceramic part according to any one of Embodiments 31 or 32, wherein the second cured ceramic layer is cantilevered with respect to the first cured layer.

Embodiment 34 provides the ceramic part according to any one of Embodiments 31-33, wherein the at least one of the first cured ceramic layer and the second cured ceramic layer are continuous.

Embodiment 35 provides the ceramic part according to any one of Embodiments 31-34, wherein the at least one of the first cured ceramic layer and the second cured ceramic layer are discontinuous.

What is claimed is:

1. A system for forming a ceramic part, the system comprising:
   a chamber having a first closed end and a second end defining an opening, the chamber adapted to hold a first layer and a second layer of a ceramic slurry, wherein the ceramic slurry has a viscosity of about 3 Pas to about 500 Pas;
   a platform disposed within the chamber and adapted to move vertically in a z-direction between a first position proximate to the first closed end and a second position proximate to the second end;
   an applicator comprising a beveled edge adapted to move laterally in a planar direction across at least a portion of the second end of the chamber, wherein the applicator is adapted for scraping the first and second layers of the ceramic slurry into the chamber;
   a thermoelectric component thermally coupled to the platform and the applicator, wherein the thermoelectric component is configured to simultaneously cool the platform and heat the applicator, wherein the applicator and the platform are maintained at different temperatures;

a light source positioned in line with the second end of the chamber; and a digital micro-mirror device positioned between the light source and the second end of the chamber, wherein the digital micro-mirror device is movable between an open position and a closed position and a first image is projected when the digital micro-mirror device is in the open position and a second image, different than the first image is projected when the digital micro-mirror device is in the closed position, the digital micro-mirror device adapted for curing a portion of the second layer of the ceramic slurry, the portion of the second layer overhanging an uncured portion of the first layer.

2. The system of claim 1, wherein the platform is adapted to be positioned is movable to a third position between the first position and the second position.

3. The system of claim 1, wherein the beveled edge of the applicator is adapted to press a ceramic slurry against the platform.

4. The system of claim 1, wherein the applicator further comprises a channel extending through the beveled edge.

5. The system of claim 1, wherein the digital micro-mirror device is further movable to a third position that is different than the first position and the second position.

6. The system of claim 1, wherein the light sources is an ultra violet light source.

7. The system of claim 1, wherein the applicator is maintained at a temperature in a range of from about 50° C. to about 150° C.

8. The system of claim 1, wherein the platform is maintained at a temperature in a range of from about 0° C. to about 40° C.

9. The system of claim 1, wherein the ceramic slurry has a viscosity ranging from about 3 Pas to about 300 Pas.

10. The system of claim 1, wherein the ceramic slurry comprises a ceramic powder and a photocurable resin.

11. A method of forming a ceramic part, the method comprising:
layering a substrate with a ceramic slurry from an applicator, the ceramic slurry having a viscosity ranging from about 3 Pas to about 500 Pas;
simultaneously heating the applicator and cooling the substrate;
scraping a first layer of the ceramic slurry across a portion of a first surface of the substrate;
curing the first layer of the ceramic slurry to form a first cured ceramic layer;
moving the substrate in a z-direction from a first position to a second position;
scraping a second layer of the ceramic slurry across a first surface of the first cured ceramic layer, wherein a surface area of a first surface of the second layer of the ceramic slurry is larger than a surface area of a first surface of the first cured ceramic layer; and
curing the second layer of the ceramic slurry to form a second cured ceramic layer,
wherein at least one of the first layer of ceramic slurry and the second layer of ceramic slurry comprises a ceramic powder and a photocurable resin and scraping at least one of the first layer of ceramic slurry and the second layer of ceramic slurry comprises biasing an applicator having a beveled edge against the layer and moving the applicator in a planar direction.

12. The method of claim 11, wherein the substrate is a platform.

13. The method of claim 12, further comprising dispensing at least one of the first layer of ceramic slurry on the substrate and the second layer of ceramic slurry on the first layer of ceramic slurry through a channel in the applicator.

14. The method of claim 11, wherein a viscosity of at least one of the first layer of ceramic slurry and the second layer of ceramic slurry ranges from about 3 Pas to about 200 Pas.

15. The method of claim 11, wherein the ceramic powder ranges from about 10 wt % to about 99 wt % of at least one of the first layer of ceramic slurry and the second layer of ceramic slurry.

16. The method of claim 11, wherein the ceramic powder comprises a ceramic material chosen from fused aluminium oxide material, heat treated aluminium oxide material, sintered aluminium oxide material, silicon carbide material, titanium diboride, boron carbide, tungsten carbide, titanium carbide, cubic boron nitride; garnet, fused alumina-zirconia, cerium oxide, zirconium oxide, titanium oxide, or mixtures thereof.

17. The method of any one of claim 11, wherein the method is free of including a support structure to form the second cured ceramic layer.

18. A ceramic part formed according to the method of any one of claim 11, the part comprising:
the first cured ceramic layer;
the second cured ceramic layer adjacent to the first cured ceramic layer,
wherein a surface area of a first surface of the first cured ceramic layer is smaller than a surface area of a first surface of the second cured ceramic layer.

19. The ceramic part of claim 18, wherein the first cured ceramic layer and the second cured ceramic layer are free of a fracture tip caused by removal of a support structure.

20. The ceramic part of claim 18, wherein the second cured ceramic layer is cantilevered with respect to the first cured layer.

21. The ceramic part of claim 18, wherein the at least one of the first cured ceramic layer and the second cured ceramic layer are continuous.

* * * * *

UNITED STATES PATENT AND TRADEMARK OFFICE
CERTIFICATE OF CORRECTION

PATENT NO. : 10,751,909 B2
APPLICATION NO. : 15/998708
DATED : August 25, 2020
INVENTOR(S) : Song et al.

Page 1 of 1

It is certified that error appears in the above-identified patent and that said Letters Patent is hereby corrected as shown below:

In the Specification

In Column 4, Line 30, delete "Glabeck" and insert --Gladbeck-- therefor

In Column 8, Line 10, delete "(FLGPWHOI" and insert --(FLGPWH01-- therefor

In the Claims

In Column 14, Line 31, in Claim 16, delete "nitride;" and insert --nitride,-- therefor Signed and Sealed this
Second Day of March, 2021

Drew Hirshfeld
*Performing the Functions and Duties of the*
*Under Secretary of Commerce for Intellectual Property and*
*Director of the United States Patent and Trademark Office*